(12) United States Patent
Skurdalsvold et al.

(10) Patent No.: US 12,025,231 B2
(45) Date of Patent: Jul. 2, 2024

(54) WEAR-RESISTANT HYDRAULIC FRACTURING PUMP VALVES

(71) Applicant: SPM OIL & GAS INC., Fort Worth, TX (US)

(72) Inventors: Scott Skurdalsvold, Mansfield, TX (US); Connor James Docherty, Fort Worth, TX (US); Ralph E. Harris, Fort Worth, TX (US)

(73) Assignee: SPM Oil & Gas Inc., Fort Worth, TX (US)

( * ) Notice: Subject to any disclaimer, the term of this patent is extended or adjusted under 35 U.S.C. 154(b) by 174 days.

(21) Appl. No.: 17/761,382

(22) PCT Filed: Oct. 26, 2020

(86) PCT No.: PCT/US2020/057388
§ 371 (c)(1),
(2) Date: Mar. 17, 2022

(87) PCT Pub. No.: WO2021/081513
PCT Pub. Date: Apr. 29, 2021

(65) Prior Publication Data
US 2022/0268362 A1    Aug. 25, 2022

Related U.S. Application Data

(60) Provisional application No. 62/926,250, filed on Oct. 25, 2019.

(51) Int. Cl.
*F16K 1/38*     (2006.01)
*E21B 43/12*    (2006.01)
(Continued)

(52) U.S. Cl.
CPC .............. *F16K 1/385* (2013.01); *E21B 43/12* (2013.01); *E21B 43/2607* (2020.05); *F16K 1/46* (2013.01)

(58) Field of Classification Search
CPC ........ F16K 1/385; F16K 1/46; E21B 43/2607; E21B 43/12
(Continued)

(56) References Cited

U.S. PATENT DOCUMENTS 1,716,896 A * 6/1929 Miller ................. F04B 53/1027
                                                        137/902
2,163,472 A * 6/1939 Shimer ................. F16K 15/063
                                                        137/902
(Continued)

OTHER PUBLICATIONS

International Search Report and Written Opinion dated Feb. 2, 2021 in connection with International Application No. PCT/US2020/057388, 9 pages.

*Primary Examiner* — William M McCalister

(57) ABSTRACT

The present disclosure relates, to a wear-resistant hydraulic fracturing pump valve for use in a valve housing, the wear-resistant hydraulic fracturing pump valve comprising: (a) a valve head extending radially from a central axis, the valve head comprising: (i) a first bottom surface comprising a metal and positioned closest to a base of the valve head, wherein the first bottom surface is configured to form a metal seal with a top surface of a valve seat; and (ii) a first annular groove positioned directly adjacent and above the first bottom surface; and (b) a first wear-resistant pump valve gasket configured to mount inside the first annular groove and to form a valve gasket seal with the top surface of the valve seat.

21 Claims, 7 Drawing Sheets

(51) Int. Cl.
*E21B 43/26* (2006.01)
*F16K 1/46* (2006.01)

(58) Field of Classification Search
USPC .................................................. 251/332, 333
See application file for complete search history.

(56) References Cited

U.S. PATENT DOCUMENTS

| | | | | |
|---|---|---|---|---|
| 3,039,488 A * | 6/1962 | Bowerman | ............... | F16K 1/46 251/332 |
| 3,057,372 A * | 10/1962 | Sutton | ............... | F16K 1/46 251/332 |
| 3,077,896 A * | 2/1963 | Weingard | ............... | F16K 17/0406 137/516.25 |
| 3,324,880 A * | 6/1967 | Roberts | ............... | F04B 53/1025 137/516.29 |
| 3,382,894 A * | 5/1968 | Shurtleff | ............... | F16K 51/02 137/625.5 |
| 4,076,212 A * | 2/1978 | Leman | ............... | F16K 1/46 137/902 |
| 4,688,757 A * | 8/1987 | Cook | ............... | F16K 1/46 251/210 |
| 4,951,707 A * | 8/1990 | Johnson | ............... | F04B 53/1025 251/332 |
| 5,123,436 A * | 6/1992 | Koechlein | ............... | G05D 16/0666 137/12 |
| 5,193,577 A * | 3/1993 | de Koning | ............... | F04B 53/1087 251/332 |
| 6,701,955 B2 * | 3/2004 | McIntire | ............... | F04B 15/02 137/902 |
| 7,591,450 B1 * | 9/2009 | Blume | ............... | F16K 15/06 137/516.29 |
| 7,641,175 B1 * | 1/2010 | Blume | ............... | F16K 1/385 251/282 |
| 7,931,252 B2 * | 4/2011 | Shindo | ............... | F16K 47/04 251/333 |
| 8,037,897 B2 * | 10/2011 | McIntire | ............... | F04B 53/102 137/902 |
| 8,141,849 B1 * | 3/2012 | Blume | ............... | F16K 1/38 137/516.29 |
| 9,291,274 B1 * | 3/2016 | Blume | ............... | F16K 15/063 |
| 10,240,597 B2 * | 3/2019 | Bayyouk | ............... | F04B 53/22 |
| 11,041,570 B1 * | 6/2021 | Buckley | ............... | F04B 1/0461 |
| 11,085,544 B2 * | 8/2021 | Yeung | ............... | F04B 47/04 |
| 2003/0052297 A1 * | 3/2003 | Enzaki | ............... | F16J 15/062 251/332 |
| 2009/0314979 A1 * | 12/2009 | McIntire | ............... | F04B 53/102 251/334 |
| 2010/0072411 A1 * | 3/2010 | Norton | ............... | F16K 31/1225 251/333 |
| 2013/0020521 A1 * | 1/2013 | Byrne | ............... | F16K 15/063 251/359 |
| 2014/0264134 A1 * | 9/2014 | Butler | ............... | F16K 1/385 251/357 |
| 2014/0367602 A1 * | 12/2014 | Filipow | ............... | F04B 43/04 251/358 |
| 2016/0160848 A1 * | 6/2016 | Toppings | ............... | F04B 7/0088 417/559 |
| 2016/0215588 A1 | 7/2016 | Belshan et al. | | |
| 2016/0238156 A1 * | 8/2016 | Hubenschmidt | ......... | F16K 1/38 |
| 2017/0342976 A1 * | 11/2017 | Nagaraja Reddy | ............... | F04B 53/1032 |
| 2019/0120389 A1 * | 4/2019 | Foster | ............... | F16K 1/443 |
| 2019/0154034 A1 * | 5/2019 | Bayyouk | ............... | F04B 53/1087 |
| 2019/0316685 A1 * | 10/2019 | Wang | ............... | F16K 15/063 |
| 2020/0400140 A1 * | 12/2020 | Bayyouk | ............... | F16K 17/162 |
| 2022/0268362 A1 * | 8/2022 | Skurdalsvold | ............ | F16K 1/46 |

\* cited by examiner

WEAR-RESISTANT HYDRAULIC FRACTURING PUMP VALVES

CROSS-REFERENCE TO RELATED APPLICATIONS

This application is a U.S. National Stage entry of and claims priority to PCT Application No. PCT/US2020/057388 filed Oct. 26, 2020, which itself claims priority to U.S. Provisional Patent Application No. 62/926,250 filed Oct. 25, 2019. The contents from all of the above are hereby incorporated in their entirety by reference.

FIELD OF THE DISCLOSURE

The present disclosure relates, in some embodiments, to wear-resistant hydraulic fracturing pump valves.

BACKGROUND OF THE DISCLOSURE

Reciprocating positive displacement pumps are used in the oil and gas industry to move drilling mud, fracturing fluids, and sand. These pumps function through the repeated back-and-forth movement (strokes) of a piston. During a first stroke of a piston, a vacuum is created that opens an inlet valve and closes an outlet valve, thereby drawing fluid through a pump intake into a piston chamber. This is called a suction stroke. Next, in a compression stroke, a piston reverses direction, closing an inlet valve and opening an outlet valve, which permits a fluid contained in a piston chamber to be discharged through a pump outlet.

A hydraulic fracturing pump valve assembly connects to both a pump intake and a pump outlet so that drilling mud, fracturing fluids, and sand flow in one direction as the piston of the piston pump reciprocates as long as the seals (e.g., rubber, metal) of the hydraulic fracturing pump valve maintain their integrity. Hydraulic fracturing pump valve assemblies desirably function under harsh wellbore conditions including, for example, high temperatures, high pressures, shock exposure, abrasion from fluids containing solids, and exposure to various hydrocarbons from oil. Additionally, hydraulic fracturing pump valve assemblies desirably oscillate between an open and closed setting at high frequencies.

Seal failure, often due to valve and valve seat surface wear (e.g., rubber, metal), is a common cause of hydraulic fracturing pump valve assembly failure and results in a system shut down for part replacement. Such shut downs lead to overall system inefficiencies and thereby costs.

SUMMARY

Accordingly, there is a need for wear-resistant hydraulic fracturing pump valves. The present disclosure describes wear-resistant hydraulic fracturing pump valves, including wear-resistant pump valve gaskets and various configurations of bottom surfaces made of metal.

In some embodiments, the present disclosure relates, to a wear-resistant hydraulic fracturing pump valve for use in a valve housing, the wear-resistant hydraulic fracturing pump valve may comprise (a) a valve head extending radially from a central axis, the valve head comprising: (i) a first bottom surface comprising a metal and positioned closest to a base of the valve head, wherein the first bottom surface is configured to form a metal seal with a top surface of a valve seat; and (ii) a first annular groove positioned directly adjacent and above the first bottom surface; and (b) a first wear-resistant pump valve gasket configured to mount inside the first annular groove and to form a valve gasket seal with the top surface of the valve seat.

A wear-resistant hydraulic fracturing pump valve, the wear-resistant hydraulic fracturing pump valve may comprise (a) a valve head extending radially from a central axis, the valve head comprising: (i) a first bottom surface comprising a first metal and positioned closest to a base of the valve head, wherein the first bottom surface is configured to form a first metal seal with a top surface of a valve seat; (ii) a first annular groove positioned directly adjacent and above the first bottom surface; (iii) a second bottom surface comprising a second metal and positioned directly adjacent and above the first annular groove, wherein the second bottom surface is configured to form a second metal seal with the top surface of the valve seat; (iv) a second annular groove positioned directly adjacent and above the second bottom surface; and (v) a third bottom surface comprising a third metal and positioned directly adjacent and above the second annular groove, wherein the third bottom surface is configured to form a third metal seal with the top surface of the valve seat; (b) a first wear-resistant pump valve gasket configured to mount inside the first annular groove and to form a first valve gasket seal with the top surface of the valve seat; and (c) a second wear-resistant pump valve gasket configured to mount inside the second annular groove and to form a second valve gasket seal with the top surface of the valve seat.

A wear-resistant hydraulic fracturing pump valve may comprise a second bottom surface positioned directly adjacent and above the first annular groove, wherein the second bottom surface comprises a metal, and wherein the second bottom surface is configured to form a second metal seal with the top surface of the valve seat.

A wear-resistant hydraulic fracturing pump valve further may comprise a second annular groove positioned directly adjacent and above the second bottom surface and a second wear-resistant pump valve gasket configured to mount inside the second annular groove and to form a second valve gasket seal with the top surface of the valve seat. A wear-resistant hydraulic fracturing pump valve further may comprise a shelf that places the first bottom surface and the second bottom surface in different parallel planes from each other. A first wear-resistant pump valve gasket may have a pressure rating of at least about 15,000 pounds per square inch. A first wear-resistant pump valve gasket may have a temperature rating of at least about 300° F. At least one guide may be a wing guide. A wear-resistant hydraulic fracturing pump valve further may comprise four guides. At least one guide may be configured to fit into a valve seat. A metal may include stainless steel, carbon steel, titanium, nickel, magnesium, aluminum, brass, copper, and alloys thereof. A first wear-resistant pump valve gasket may comprise a polymer including polyurethane, polyethylene, polypropylene, polyvinyl chloride, nylon, polytetrafluoroethylene, thermoplastic polyurethane, polystyrene, copolymers thereof, and combinations thereof.

BRIEF DESCRIPTION OF THE DRAWINGS

Some embodiments of the disclosure may be understood by referring, in part, to the present disclosure and the accompanying drawings, wherein.

DETAILED DESCRIPTION

The present disclosure relates, in some embodiments, to wear-resistant pump valves, such as those contained within hydraulic fracturing pumps. In general, hydraulic fracturing pump valves or pump valves are considered to be consumables that regularly wear and need to be replaced, thereby requiring system down time during its replacement. Disclosed wear-resistant pump valves include wear-resistant pump valve gaskets (hereinafter "valve gaskets") and various positional configuration seals (e.g., valve gasket seals, metal surfaces, rubber seals) such that they wear more slowly than known pump valves. By slowing wear, the wear-resistant pump valves have longer life spans that their known counterparts and thereby increased fracking pump productivity.

Figure 1:
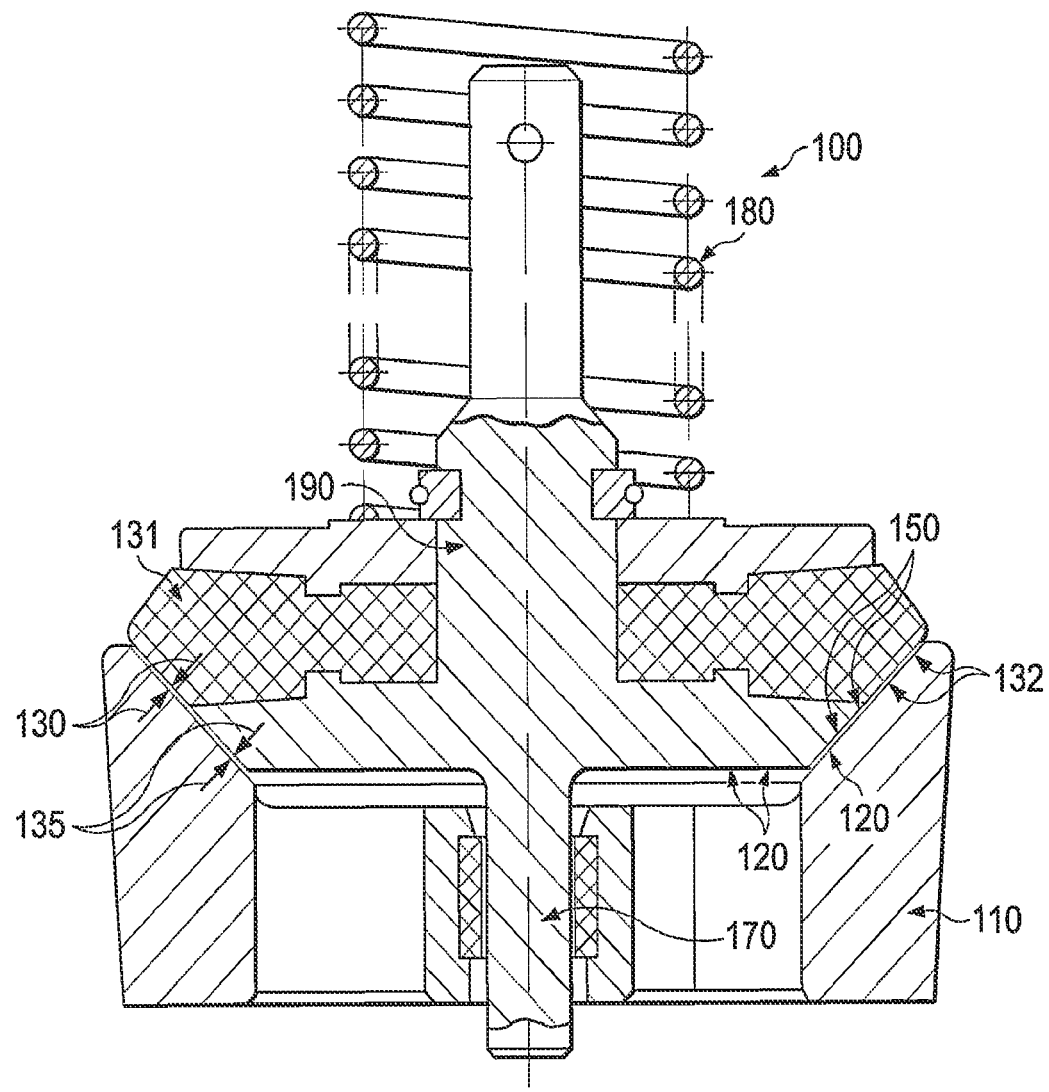
FIG. 1 illustrates a cross-sectional perspective of a known hydraulic fracturing pump valve forming a metal seal and a rubber seal with a valve seat.

As means of background, FIG. 1 illustrates a known pump valve assembly 100 including a hydraulic fracturing pump valve 190 engaging a spring 180 and a valve seat 110. As shown, the pump valve assembly 100 is in a closed position such that fracking fluid is prevented from flowing through the valve assembly by a rubber seal 130 and a metal seal 135. A rubber seal 130 is made between a surface 132 of a standard ring 131 and a top surface 150 of a valve seat 110, whereas a metal seal 135 is made between the top surface of the valve seat 110 and a pump valve bottom surface 120 (hereinafter "bottom surface") made of metal. Fracking fluid generates pressure on a bottom surface 120 of pump valve 190 and compresses spring 180. As spring 180 is compressed, pump valve 190 is pushed away from a top surface 150 of valve seat 110, creating a space between the pump valve 190 and the valve seat 110. Once a space is created, fluid is capable of flowing from the bottom of the pump valve 190 through the space and along a fluid path to other pump locations including a piston chamber (not shown). Pump valve 190 may include a guide 170 extending from a bottom surface 120 of the pump valve. Guide 170 is configured to direct movement of the pump valve relative to valve seat 110 as the pump valve 190 opens and closes. FIG. 1 illustrates guide 170 as a cylindrical metal leg extending from bottom surface 120 of pump valve 190. However, guide 170 may have any number of configurations, for example a guide may be any number of legs extending downward from the bottom surface 120 of pump valve 190 and configured to direct the movement of pump valve 190 relative to valve seat 110. For example, as a pump valve 190 changes positions relative to a valve seat 110, a guide 170 keeps the pump valve 190 engaged with the valve seat 110 so that the pump valve 190 may return to its initial position of fitting tightly against the valve seat 110.

As shown in FIG. 1, when a pump valve 190 is in a closed position, fluid is prevented from passing through a valve assembly 100 by the combination of a rubber seal 130 and a metal seal 135. When the pump valve 190 is in a closed position, a metal seal may be formed adjacent to a bottom surface 120 of pump valve 190 as a result of direct contact between at least a top surface 150 of a valve seat 110 and the bottom surface, when the valve pump is in a closed position. A valve assembly may further include a rubber seal 130 formed by the direct interaction between a surface 132 of a standard ring 131 and a top surface 150 of a valve seat 110. A standard ring 131 is configured to directly contact at least a portion of a top surface 150 of a valve seat 110 when the valve pump 190 is in a closed position. The seal may be broken while a pump valve 190 is in an open position where there is no direct contact between a standard ring 131 and/or a bottom surface 120 of pump valve 190 and a top surface 150 of a valve seat 110.

In comparison to a metal seal 135, a rubber seal 130 provides most of the seal between a pump valve 190 and a valve seat 110 at lower pressures. However, as fracking fluid passes through a valve assembly while a pump valve 190 is in an open position, it wears down the rubber seal 130 (e.g., by wearing of a standard ring 131, which reduces the potential connectivity between the standard ring and a top surface 150 of a valve seat 110). This reduction in connectivity continues to increase as the pressure continues to rise, eventually resulting in complete failure of rubber seal 130.

Both the standard ring 131 and the bottom surface 120 made of metal will eventually give way once a threshold pressure is generated; however the combination of rubber and metal seals helps prevent premature fluid flow.

Fracking fluid contains abrasive and caustic components that cause wear and degradation of standard ring 131, pump valve 190, and valve seat 110. Such degradation decreases the stability of rubber seal 130 and metal seal 135 as the components of these seals (e.g., valve gasket seals, metal seals, rubber seals) are less capable of achieving degree of connectivity that will prevent fluid pass through. As rubber seal 130 and/or metal seal 135 wear, a fracking fluid may undesirably leak through a valve assembly 100 when the valve assembly is in the closed position. Fluid leaking in a valve assembly can result in pressure problems in the hydraulic fracking pump and require pump shut down for repair or replacement of the worn pump valve.

The present disclosure relates to pump valve designs having improved working life spans in comparison to known pump valves. Specifically, some embodiments of the present disclosure relate to pump valve designs including wear resistant valve gaskets rather than standard rings. Further, the present disclosure relates to valve assemblies having various positional configurations of seals between a pump valve and a valve seat (e.g., valve gasket seals, metal seals, rubber seals) while providing superior wear resistance. In some embodiments, disclosed pump valves include a series of valve gaskets along with one or more pump valve bottom surface made of metal. According to some embodiments, bottom surfaces may be configured in alternating planes to generate a path through which fracking fluid can flow that reduces exposure of the most vulnerable pump components to the fracking fluid.

Valve Gaskets

Known hydraulic fracturing pumps include standard rings that are primarily composed of rubber and are particularly susceptible to wear when exposed to abrasive and/or caustic materials, for example standard ring 131 of FIG. 1. The present disclosure relates to a wear resistant hydraulic fracking pump that may include one or more wear-resistant valve gaskets that can provide for a valve gasket seal between the valve gasket and a valve seat. Disclosed wear-resistant valve gaskets may be less susceptible to wear in comparison to standard rings.

A valve gasket may be composed of one or more polymers including a polyurethane, a polyethylene, a polypropylene, a polyvinyl chloride, a nylon, a polytetrafluoroethylene, a thermoplastic polyurethane, a polystyrene, copolymers thereof, and combinations thereof. In some embodiments, a valve gasket can be composed of a polyurethane such as a thermosetting polyurethane or a thermoplastic polyurethane. A disclosed valve gasket may have a polyurethane content of at least about 50 wt. %, or at least about 55 wt. %, or at least about 60 wt. %, or at least about 65 wt. %, or at least about 70 wt. %, or at least about 75 wt. %, or at least about 80 wt. %, or at least about 85 wt. %, or at least about 90 wt. %, or at least about 95 wt. %, or at least about 99 wt. % of the valve gasket, where about includes plus or minus 2.5 wt. %.

The composition of a valve gasket may be adjusted to meet certain functional needs such as having various physical characteristics such as color, pressure rating, and temperature rating without deviating from the scope of the present disclosure.

In some embodiments, a valve gasket may have a pressure rating from about 5,000 pounds per square inch to about 15,000 pounds per square inch. A pressure rating indicates an approximate pressure that a valve gasket will adequately function while maintaining structural integrity. In some embodiments, a valve gasket may include a pressure rating of at least about 5,000 pounds per square inch, or at least about 7,500 pounds per square inch, or at least about 10,000 pounds per square inch, or at least about 12,500 pounds per square inch, or at least about 15,000 pounds per square inch, where about includes plus or minus 1,250 pounds per square inch.

According to some embodiments, a valve gasket may have a temperature rating from about 100° F. to about 300° F. A temperature rating for a valve gasket indicates an approximate temperature at which a valve gasket will adequately function while maintaining structural integrity. A valve gasket may include a temperature rating of at least about 100° F., or at least about 150° F., or at least about 200° F., or at least about 250° F., or at least about 300° F., where about includes plus or minus 25° F.

Pump Valve Bottom Surfaces

According to some embodiments, a disclosed pump may include a pump valve having a bottom surface that is configured to contact a top surface of a valve seat while the pump valve is in the closed position. Additionally, a bottom surface can be comprised of various metals without deviating from the scope of this disclosure. The composition of a bottom surface may be selected to meet specific functional requirements of a pump valve. A bottom surface can be made of a metal including stainless steel, carbon steel, titanium, nickel, magnesium, aluminum, brass, copper, alloys of the foregoing metals, and various combinations thereof. In some embodiments, a bottom surface of a pump valve can be composed of stainless steel thereby rendering the bottom surface increasingly resistant against corrosion caused by exposure to fracking fluid.

Valve Guide

In some embodiments, a disclosed pump valve may include a guide that engages a valve seat as the valve opens and closes, the guide being configured to keep the pump valve engaged with a valve seat when the valve is open so that the pump valve may return to its initial position of fitting tightly against the valve seat as the valve closes. Improper alignment of a pump valve with a valve seat can lead to pump failure. Proper alignment of a pump valve and valve seat may reduce pump valve wear by avoiding unnecessary collisions due to misalignment. A disclosed pump valve may include one or more guides, for example a pump valve may include between one and four guides. Having more than one guide may desirably permit a pump valve to more readily align with a valve seat as the pump valve moves into a closed position. A guide can be various shapes and/or sizes without deviating from the scope of the present disclosure. For example, a guide may be substantially cylindrical or have a polygonal cross-section. Additionally, the outermost portion of a guide may be flat, rounded, pointed, and combinations thereof without deviating from the disclosure.

Pump Valve Configurations

Figure 2:
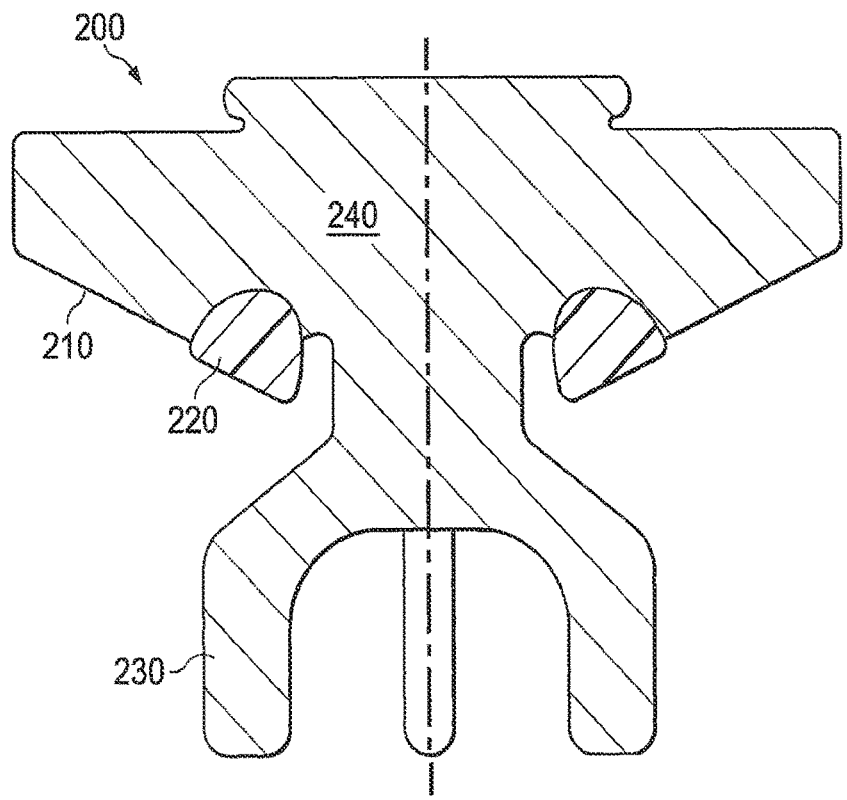
FIG. 2 illustrates a cross-sectional perspective of a hydraulic fracturing pump valve having a wear-resistant pump valve gasket at the base of the valve head and a bottom surface made of metal towards the cap of the valve head, according to a specific example embodiment of the disclosure.

Various pump valve configurations described herein may advantageously provide for valve gasket seals and metal seals that are less prone to wear in comparison to known pump valve configurations. As illustrated in FIG. 2, a pump valve 200 of the present disclosure may include a valve gasket 220 at the bottom of the valve head 240 and a bottom surface 210 made of a metal that is positioned closer to the top portion of a valve head 240 than valve gasket 220. A valve gasket 220 may form a valve gasket seal with a valve seat and a bottom surface 210 may form a metal seal with a valve seat. A disclosed pump valve 200 configuration as shown in FIG. 2 may desirably provide for an increased sealing ability relative to the configuration shown in FIG. 1. This may be due to a disclosed pump valve 200 having a valve gasket 220 at the lower portion of a valve head 240.

In some embodiments, a disclosed pump valve 200 may include one or more valve gasket 220. A valve gasket may be inserted into an annular groove residing on a valve head 240. A pump valve may include one or more annular grooves configured to reversibly or irreversibly receive a valve gasket. For example, a valve gasket 220 may be fitted inside of an annular groove and may retain its position within the annular groove without the need for an adhesive to reversibly receive the valve gasket. In some embodiments, a valve gasket may retain its position within an annular groove through use of an adhesive, to irreversibly receive the valve gasket. An annular groove may be any shape and size necessary to adequately receive a valve gasket 220 of various shapes and sizes. Receiving includes being placed into, snapped into, molded into, and locked into place. A person having ordinary skill in the art would understand that in an embodiment such as FIG. 2, a standard ring (e.g., rubber) may be used in the place of a valve gasket without deviating from the general nature of this disclosure; however, such replacement would likely result in decreased performance as such standard ring would be increasingly susceptible to wear.

In some embodiments, as shown in FIG. 2, a disclosed pump valve 200 may include a guide 230 so that pump valve 200 may engage a valve seat as the valve opens and closes. A guide permits a pump valve 200 to open and then readily close by falling back into a closed position while properly aligning with a valve seat. Properly aligning with a valve seat prevents pump valve 200 failure due to misalignment problems. Additionally, properly aligning may prevent some wear on pump valve 200 components by avoiding unnecessary collisions due to misalignment. A disclosed pump valve 200 may have various configurations of guides 230, such as having from one to four guides 230. Having more than one guide 230 may desirably permit a pump valve 200 to more readily align with a valve seat as the pump valve 200 moves into a closed position. A described guide 230 can be any shape or size such as being substantially cylindrical and having a polygonal cross-section. In some embodiments, a guide 230 may have a flat end, a rounded end, or a pointed end.

Figure 3:
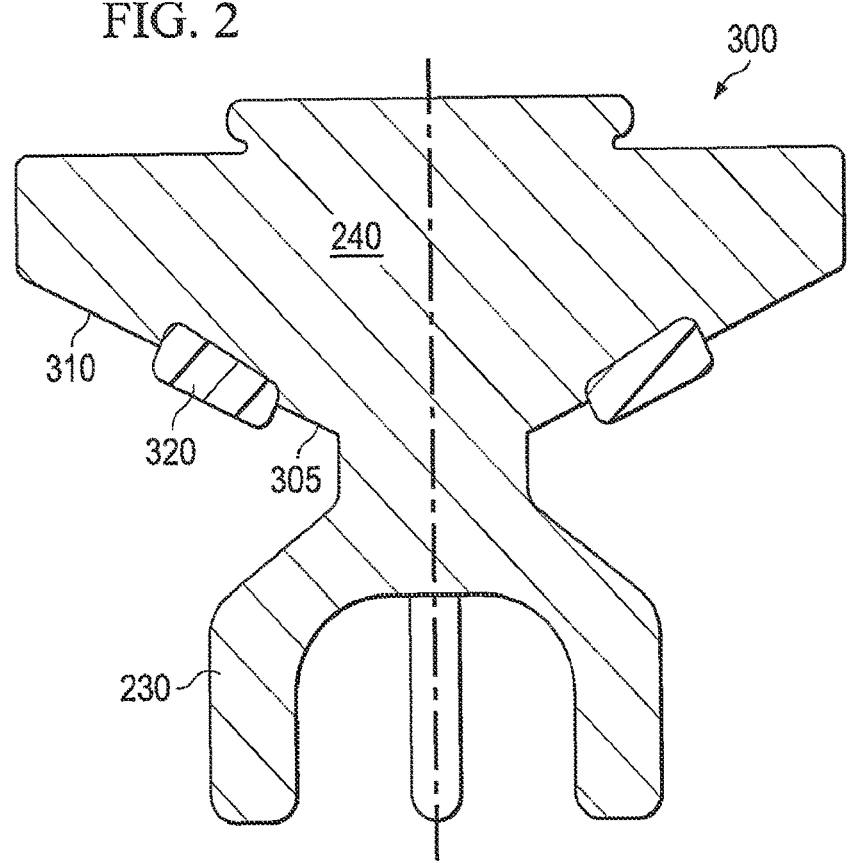
FIG. 3 illustrates a cross-sectional perspective of a hydraulic fracturing pump valve having two bottom surface made of metal and a wear-resistant pump valve gasket situated between the two bottom surfaces, according to a specific example embodiment of the disclosure.

As shown in FIG. 2, a disclosed pump valve 200 may include a valve gasket 220 at the bottom portion of the valve head 240 and a bottom surface 210 made of a metal at the top portion of the valve head 240. Some disclosed embodiments include multiple bottom surfaces composed of a metal and configured to form a metal seal, as shown in FIG. 3. In some embodiments, a disclosed pump valve 300 may include a first bottom surface 305 at the bottom portion of a valve head 240 a second bottom surface 310 towards the top of the valve head 240 and a valve gasket 320 in between the first bottom surface 305 and the second bottom surface 310. Having two bottom surfaces made of a metal allows for the formation of two metal seals, thereby reducing the likelihood of a failure in the connection between a valve seat and a disclosed pump valve 300, especially at high pressure ranges such as those above about 10,000 pounds per square inch. A bottom surface may be made of a metal including stainless steel, carbon steel, titanium, nickel, magnesium, aluminum, brass, copper, and alloys thereof. In some embodiments, having a valve gasket 320 in the middle of a valve head 240, as shown in FIG. 3 may also provide an advantageous low pressure valve gasket seal (e.g., less than about 10,000 pounds per square inch) with respect to rubber seals made by existing pump valves 190, such as those shown in FIG. 1.

Figure 4:
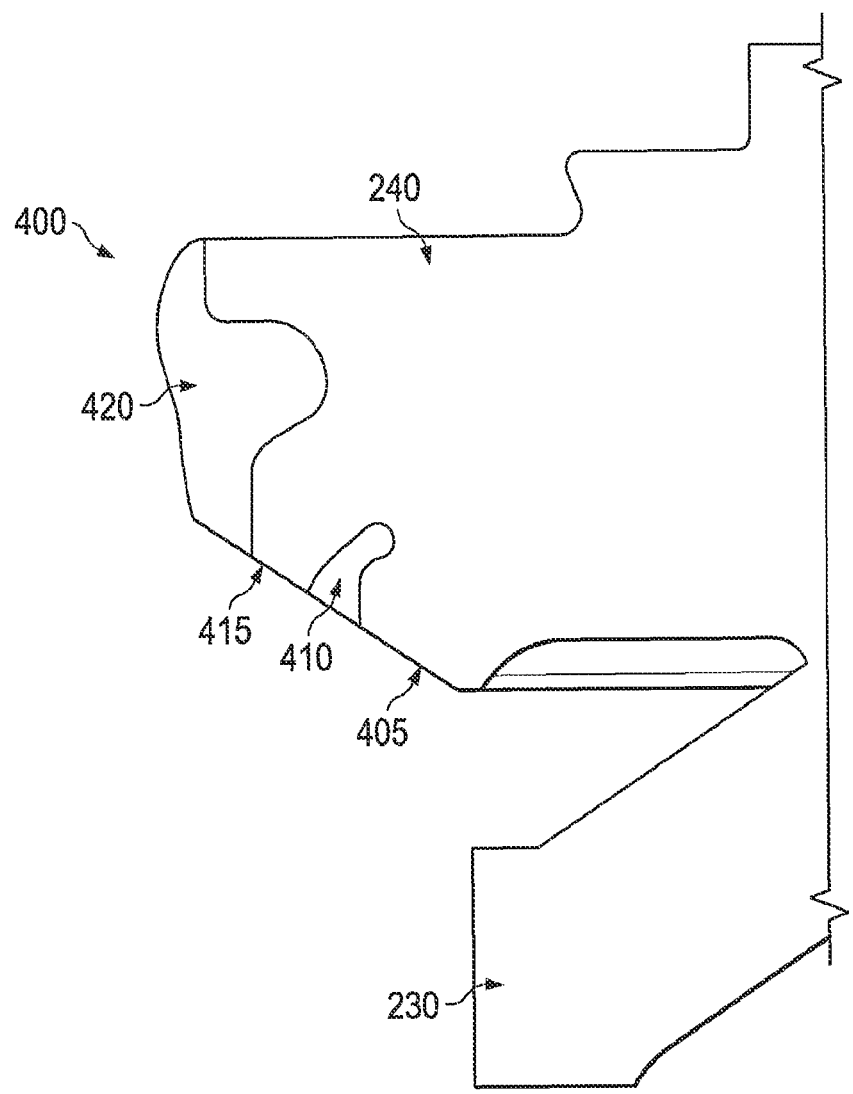
FIG. 4 illustrates a cross-sectional perspective of a hydraulic fracturing pump valve having two bottom surfaces made of metal and two wear-resistant pump valve gaskets, according to a specific example embodiment of the disclosure.

In some embodiments, as shown in FIG. 4, a disclosed pump valve 400 may include two bottom surfaces 405, 415 for forming metal seals with a valve seat and two valve gaskets 410, 420 for forming valve gasket seals with the valve seat. A disclosed pump valve 400 may contain two annular grooves that may receive one or more valve gaskets 410, 420. A pump valve 400 may have an annular groove of various shapes and sizes. An annular groove may be configured to receive a valve gasket 410, 420 of various shapes and sizes. Receiving may comprise placed into, snapped into, molded into, and locked into place. An annular groove may be configured to reversibly or irreversibly receive a valve gasket 410, 420. A person having ordinary skill in the art would understand that in an embodiment such as FIG. 3 or 4, a standard ring (e.g., rubber) may be used in the place of any or more valve gaskets without deviating from the general nature of this disclosure; however, such replacement would likely result in decreased performance when compared to an embodiment having only valve gaskets as a standard ring would be more susceptible to wear.

A disclosed pump valve 400 may have a first bottom surface 405 closest to a base of a valve head 240, a first valve gasket 410 directly adjacent and above (i.e., away from the base of the valve head) to the first bottom surface, a second bottom surface 415 directly adjacent to and above the first valve gasket 410, and a second valve gasket 420 directly adjacent to and above the second bottom surface 415. In some embodiments, a pump valve 400 may have a first bottom surface 405 and a second bottom surface 415 that have the same or different cross-sectional widths. For example, a first bottom surface 405 may have a wider cross-sectional width, a narrower cross-sectional width, or a substantially similar cross-sectional width with respect to a second bottom surface 415. A pump valve 400 may have a first valve gasket 410 and a second valve gasket 420 that have the same or different cross-sectional widths. For example, a first valve gasket 410 may have a wider cross-sectional width, a narrower cross-sectional width, or a substantially similar cross-sectional width with respect to a second valve gasket 420. A width of each of the two bottom surfaces 405, 415 and the valve gaskets 410, 420 may be adjusted in accordance with the performance needs of a disclosed pump valve 400. Each of a bottom surface 405, 415 and a valve gasket 410, 420 may have a cross-sectional width from about 0.1 inches to about 6 inches. For example, each of a bottom surface 405, 415 and a valve gasket 410, 420 may have a cross-sectional width of about 0.1 inches, or of about 1 inch, or of about 2 inches, or of about 3 inches, or of about 4 inches, or of about 5 inches, or of about 6 inches, where about includes plus or minus 0.5 inches. As shown in FIG. 4, a valve gasket 410, 420 may have any relative shape or size, including having a cross-sectional shape that is substantially circular, oval, triangle, square, quadrilateral, polygonal, curvilinear, freeform, and combinations thereof. A bottom surface 405, 415 may be composed of a metal including stainless steel, carbon steel, titanium, nickel, magnesium, aluminum, brass, copper, and alloys thereof.

Figure 5:
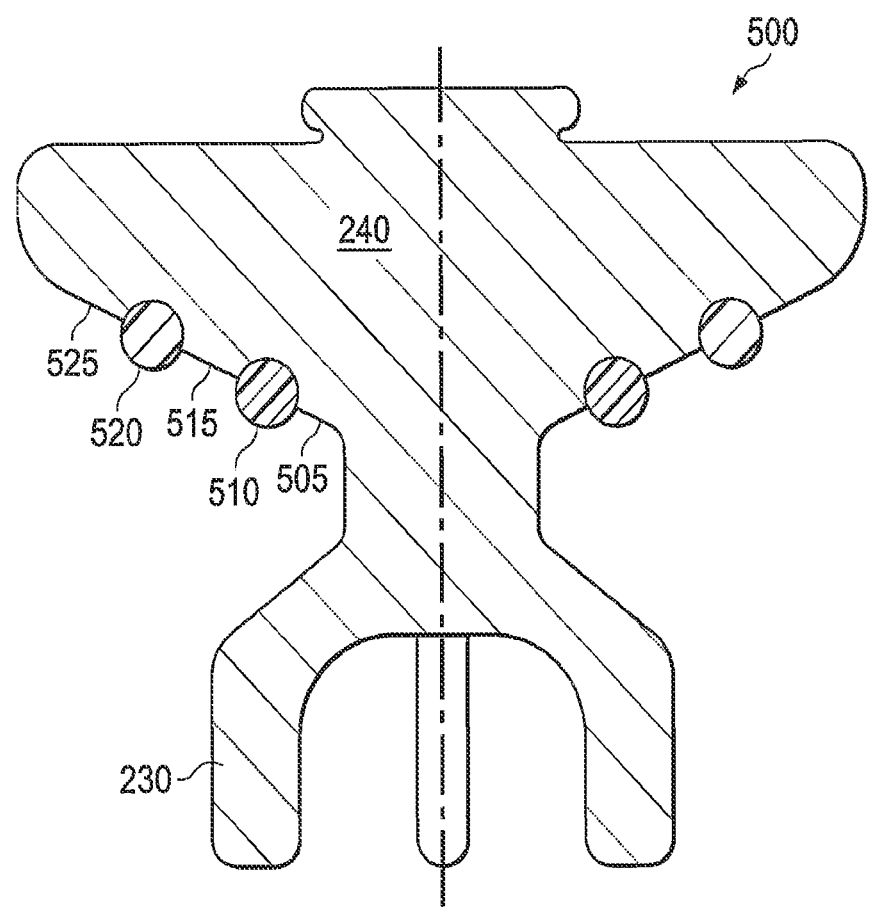
FIG. 5 illustrates a cross-sectional perspective of a hydraulic fracturing pump valve having three bottom surfaces made of metal and two wear-resistant pump valve gaskets, according to a specific example embodiment of the disclosure.

According to some embodiments, as shown in FIG. 5, a disclosed pump valve 500 may have three bottom surfaces 505, 515, 525 and two valve gaskets 510, 520. For example, a pump valve 500 includes a first bottom surface 505 closest to the base of a valve head 240, a first valve gasket 510 adjacent to and directly above (i.e., away from the base of the valve head) the first bottom surface 505, a second bottom surface 515 directly adjacent to and above the first valve gasket 510, and a second valve gasket 520 directly adjacent to and above the second bottom surface 515. A pump valve 500 may contain a third bottom surface 525 directly adjacent to and above a second valve gasket 520. As shown in FIG. 5, a pump valve 500 may have a first valve gasket 510 and a second valve gasket 520 that have a substantially circular cross section. However, a disclosed pump valve 500 may have a first valve gasket 510 and a second valve gasket 520 that have any cross-sectional shape along as having any relative width or diameter.

Figure 6:
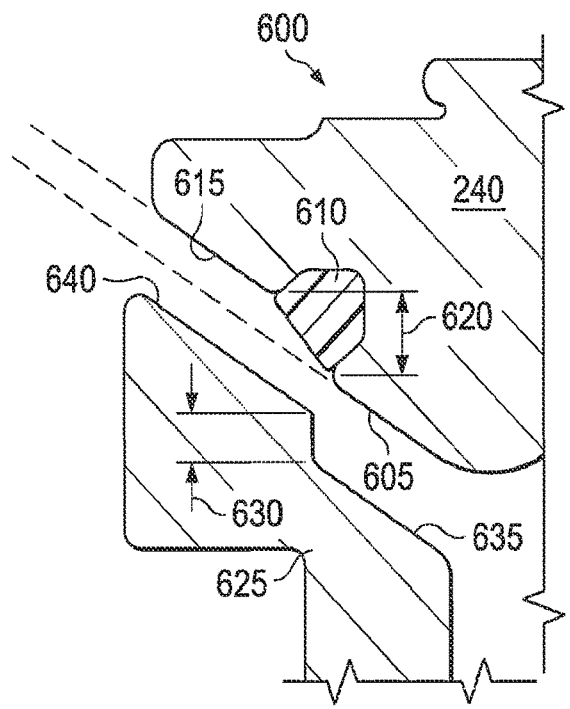
FIG. 6 illustrates a cross-sectional perspective of a valve seat and a hydraulic fracturing pump valve having two bottom surfaces made of metal, a wear-resistant pump valve gasket, and a step placing the bottom surfaces out of plane with each other, according to a specific example embodiment of the disclosure.

Although disclosed pump valves 200, 300, 400, 500 illustrate up to two valve gaskets, the present disclosure is not so limited and encompasses pump valves having any number of valve gaskets (e.g., having from one to ten valve gaskets). Having two-or-more valve gaskets as shown in FIGS. 5 and 6 410, 420, 510, 520 may desirably provide for additional lower pressure sealing points that may synergistically provide for a better seal between a valve seat and a pump valve 400, 500. In some embodiments, having two or more valve gaskets may provide for a redundant sealing source so that if one valve gasket fails to seal, a back-up valve gasket may adequately provide a seal. According to some embodiments, having more than one bottom surface as shown in FIGS. 5 and 6 may provide for a synergistic sealing effect where two-or-more bottom surface may provide for an increased seal between the bottom surfaces and a valve seat in comparison to a pump valve having one bottom surface. A pump valve 500 having three-or-more bottom surfaces, as shown in FIG. 5, may synergistically provide for an increase in high pressure seal in comparison to a corresponding pump valve 400, 300 having two-or-more bottom surfaces, or even more than a pump valve 200 having one bottom surface. In some embodiments, having more than one bottom surface may desirably provide for a back-up sealing surface against high pressure fracking fluid so that if one bottom surface fails a second or third bottom surface may continue to prevent fracking fluid leaking.

As described above, disclosed pump valves may have more than one bottom surface and more than one valve gaskets to desirably provide for a seal so that fracking fluid does not leak between a valve seat and the pump valves. In some embodiments, a disclosed pump valve may include a step in between a first bottom surface and a second bottom surface so that a fracking fluid passing through the pump valve does not contact or barely contacts the second bottom surface, a first valve gasket, and a second valve gasket. A step includes any positioning or a bottom surface to another bottom surface where they are in different parallel planes with respect to each other. A step may include a distance from a bottom surface to another bottom surface from about 0.01 inches to about 1 inch. For example, a step may include a distance from one bottom surface to a bottom surface having the closest proximity (e.g., a first bottom surface to a second bottom surface, a second bottom surface to a third bottom surface, a third bottom surface to a fourth bottom surface) of greater than about 0.01 inches, or greater than about 0.05 inches, or greater than about 0.1 inches, or greater than about 0.2 inches, or greater than about 0.3 inches, or greater than about 0.4 inches, or greater than about 0.5 inches, or greater than about 0.6 inches, or greater than about 0.7 inches, or greater than about 0.8 inches, or greater than about 0.9 inches, or greater than about 1.0 inches, where about includes plus or minus 0.05 inches. Having larger step distance may increase a protection of a valve gasket. In some embodiments, a threshold step distance may advantageously provide for a desirable wear protection for a valve gasket As shown in FIG. 6, a disclosed pump valve 600 include a step 620 in between a first bottom surface 605 and a second bottom surface 615. A pump valve 600 includes a valve gasket 610 and a valve head 240. A pump valve may include a valve seat 625 having a first valve seat top surface 635 and a second valve seat top surface 640. In some embodiments, a first bottom surface 605 may form a metal seal with a first valve seat top surface 635. A second bottom surface 615 may form a metal seal with a second valve seat top surface 640. As shown in FIG. 6, a disclosed pump valve may include a valve seat 625 having a valve seat step 630 that may have a similar or different step distance with respect to a step 620. For example, a valve seat step 630 may complement a pump valve 600 step 620. In some embodiments, a valve seat 625 does not require a step 630 to desirably interact with a disclosed pump valve 600.

Figure 7:
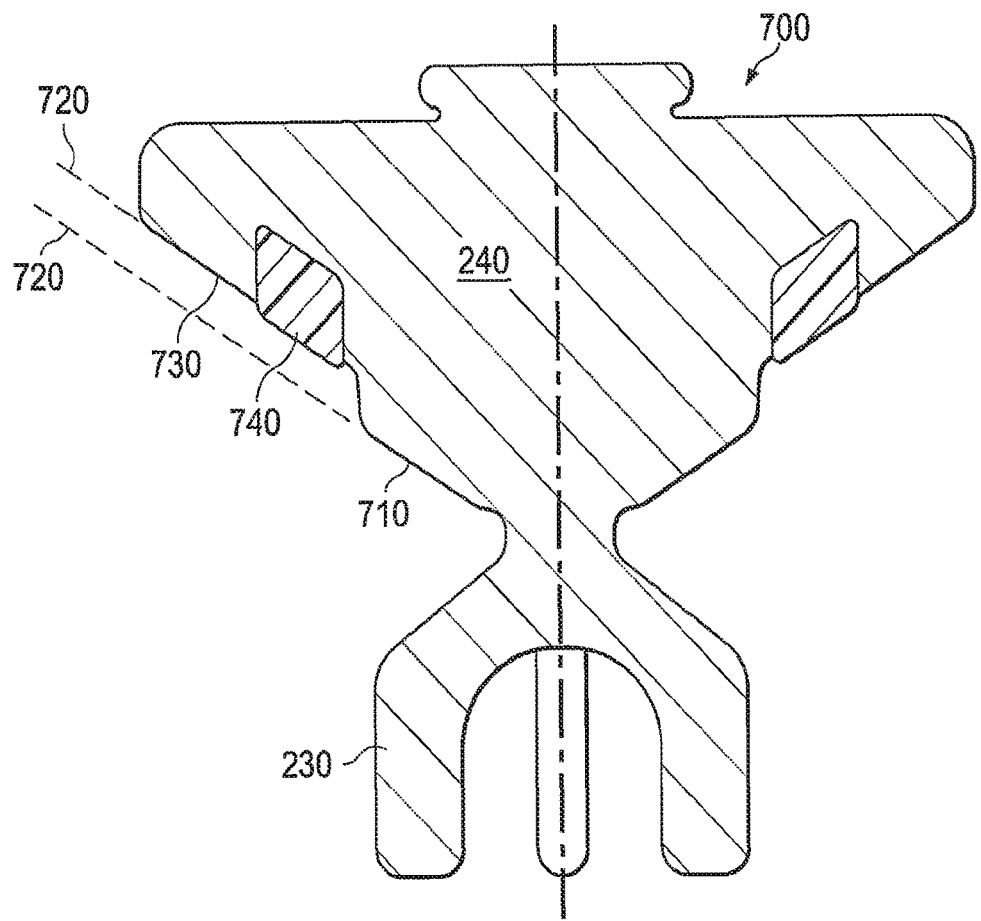
FIG. 7 illustrates a cross-sectional perspective of a hydraulic fracturing pump valve having two bottom surfaces made of metal, a wear-resistant pump valve gasket, and a step placing the bottom surfaces out of plane with each other, according to a specific example embodiment of the disclosure.

FIG. 7 discloses a pump valve 700 including a step 720 where a first bottom surface 710 is not in the same plane as both a second bottom surface 730 and a valve gasket 740. In some embodiments, a first bottom surface 710 and a second bottom surface 730 may each include a metal. In a disclosed pump valve 700 configuration as shown in FIG. 7, a valve gasket 740 may be greatly protected against wear caused by interaction with a fracking fluid since it is also in a different plane than a first bottom surface 710 that may interact with the fracking fluid significantly more than the valve gasket 740.

In some embodiments, as shown in FIGS. 3-8, disclosed pump valves 200, 300, 400, 500, 600, 700 may include a guide 230 extending from a base of a valve head 240 and outwardly from a central axis. A guide 230 may comprise legs or wing guides of various shapes and sizes. For example, a guide 230 may extend from about 0.1 inches to about 5 inches from a valve head. A described pump valve 200, 300, 400, 500, 600, 700 may comprise a plurality of guides 230. For example, a disclosed pump valve 200, 300, 400, 500, 600, 700 may comprise four guides 230. A guide 230 may be configured to provide for a means of fitting a wear-resistant pump valve into a valve seat of various shapes and sizes. A guide 230 may comprise a generally cylindrical shape, a generally conal shape, a generally rectangular prism shape, a generally wedge shape, a custom shape, and combinations thereof.

Figure 8:
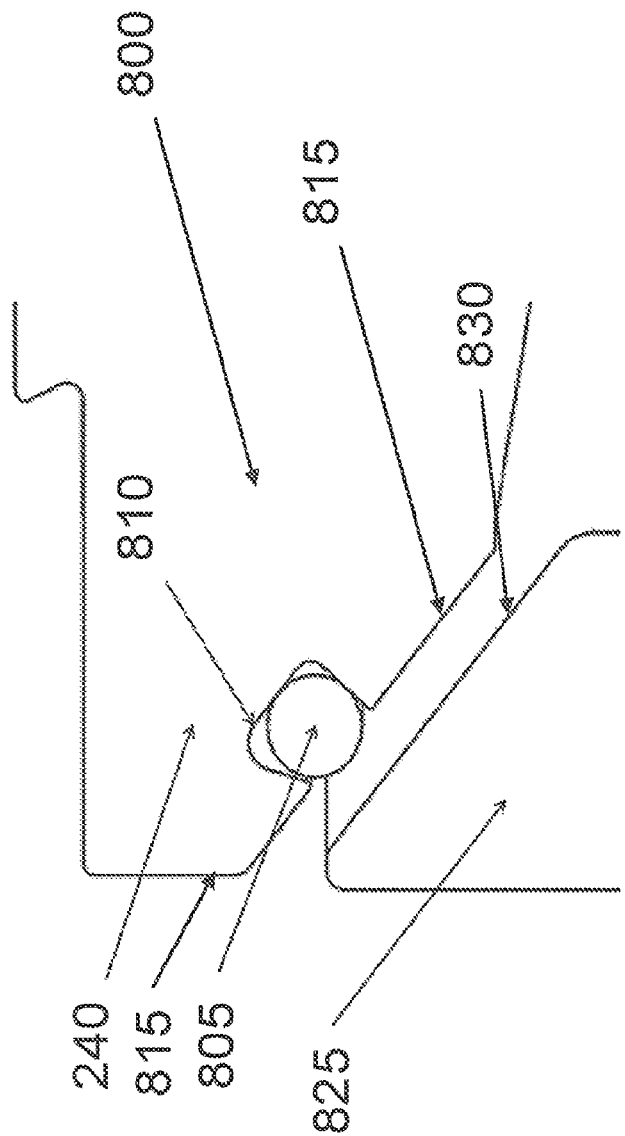
FIG. 8 illustrates a cross-sectional perspective of a hydraulic fracturing pump valve having two bottom surfaces made of metal, an O-ring shaped wear-resistant pump valve gasket, according to a specific example embodiment of the disclosure.

FIG. 8 discloses a cross-sectional perspective of a hydraulic fracturing pump valve 800 having two bottom surfaces 815, 820 of valve head 240 that are made of metal, an O-ring shaped wear-resistant pump valve gasket 805. In some embodiments, having the wear-resistant pump valve gasket 805 that is an O-ring, as opposed to cast or injected molded urethane may allow for increased metal-to-metal strike face contact area giving an enhanced stress distribution, which may lead to a longer life of the hydraulic fracturing pump valve 800. The O-ring shaped wear-resistant pump valve gasket 805 may always be in compression. Disclosed hydraulic fracturing pump valves 800 may include an O-ring groove 810, which may eliminate shear stresses in the urethane components compared with cast or injection molded urethane removing current urethane failure modes. The disclosed O-ring groove 810 may be any shape or size. For example, the O-ring groove 810 may substantially fit the O-ring shaped wear-resistant pump valve gasket 805 or one of any shape and size. A disclosed O-ring design may provide for a different wear profile of the mating component between the hydraulic fracturing pump valve 800 and the valve seat 825 in comparison to a corresponding cast or injected molded urethane wear-resistant valve gasket.

Figure 9:
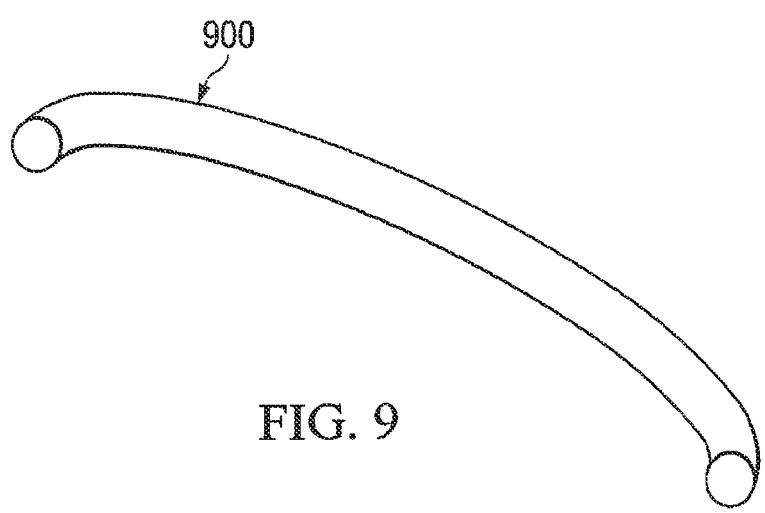
FIG. 9 illustrates an O-ring shaped wear-resistant pump valve gasket, according to a specific example embodiments of the disclosure.

FIG. 9 illustrates an O-ring shaped wear-resistant pump valve gasket 900 that is substantial torus shaped, according to a specific example embodiments of the disclosure. The O-ring shaped wear-resistant pump valve gasket 900 can be made from any material. For example, O-ring shaped wear-resistant pump valve gasket 900 can be made from any rubber including butadiene rubber, butyl rubber, chlorosulfonated polyethylene, ethylene propylene diene monomer, ethylene propylene rubber, fluoroelastomer, nitrile rubber, perfluoroelastomer, polyacrylate rubber, polychloroprene, neoprene, polysulfide rubber, polyisoprene, polytetrafluoroethylene, silicone rubber, styrene-butadiene rubber, thermoplastic elastomer, thermoplastic polyolefin, thermoplastic polyurethane, melt processable rubber, and combinations thereof. Having an O-ring shaped wear-resistant pump valve gasket 900 made of various materials may desirably provide for advantageous sealability between a hydraulic fracturing pump valve and a valve seat. In some embodiments, the O-ring shaped wear-resistant pump valve gasket 900 may snap into place within an O-ring groove of a hydraulic fracturing pump valve.

It is understood that the listed apparatuses for each unit are for illustration purposes only, and this is not intended to limit the scope of the application. A specific combination of these or other apparatuses or units can be configured in such a system for the intended use based on the teachings in the application.

Persons skilled in the art may make various changes in the shape, size, number, separation characteristic, and/or arrangement of parts without departing from the scope of the instant disclosure. Each disclosed method and method step may be performed in association with any other disclosed method or method step and in any order according to some embodiments. Where the verb "may" appears, it is intended to convey an optional and/or permissive condition, but its use is not intended to suggest any lack of operability unless otherwise indicated. Persons skilled in the art may make various changes in methods of preparing and using a composition, device, and/or system of the disclosure. Where desired, some embodiments of the disclosure may be practiced to the exclusion of other embodiments.

Also, where ranges have been provided, the disclosed endpoints may be treated as exact and/or approximations as desired or demanded by the particular embodiment. Where the endpoints are approximate, the degree of flexibility may vary in proportion to the order of magnitude of the range. For example, on one hand, a range endpoint of about 50 in the context of a range of about 5 to about 50 may include 50.5, but not 52.5 or 55 and, on the other hand, a range endpoint of about 50 in the context of a range of about 0.5 to about 50 may include 55, but not 60 or 75. In addition, it may be desirable, in some embodiments, to mix and match range endpoints. Also, in some embodiments, each figure disclosed (e.g., in one or more of the examples, tables, and/or drawings) may form the basis of a range (e.g., depicted value+/− about 10%, depicted value+/− about 50%, depicted value+/− about 100%) and/or a range endpoint. With respect to the former, a value of 50 depicted in an example, table, and/or drawing may form the basis of a range of, for example, about 45 to about 55, about 25 to about 100, and/or about 0 to about 100.

These equivalents and alternatives along with obvious changes and modifications are intended to be included within the scope of the present disclosure. Accordingly, the foregoing disclosure is intended to be illustrative, but not limiting, of the scope of the disclosure as illustrated by the appended claims.

The title, abstract, background, and headings are provided in compliance with regulations and/or for the convenience of the reader. They include no admissions as to the scope and content of prior art and no limitations applicable to all disclosed embodiments.

What is claimed is:

1. A wear-resistant hydraulic fracturing pump valve for use in a valve housing, the wear-resistant hydraulic fracturing pump valve comprising:
   (a) a valve head extending radially from a central axis, the valve head comprising:
      (i) a first bottom surface positioned closest to a base of the valve head, wherein the first bottom surface is configured to form a metal seal with a top surface of a valve seat;
      (ii) a first annular groove positioned directly adjacent and above the first bottom surface; and
      (iii) a second bottom surface positioned directly adjacent and above the first annular groove, wherein the second bottom surface is configured to form a second metal seal with the top surface of the valve seat;
   (b) a first wear-resistant pump valve gasket configured to mount inside the first annular groove and to form a valve gasket seal with the top surface of the valve seat; and
   (c) a step, the step configured to place the first bottom surface and the second bottom surface in different parallel planes from each other.

2. The wear-resistant hydraulic fracturing pump valve according to claim 1, wherein the wear-resistant hydraulic fracturing pump valve further comprises at least one guide extending out from the base of the valve head and extending outwardly from the central axis.

3. The wear-resistant hydraulic fracturing pump valve according to claim 1, wherein the wear-resistant hydraulic fracturing pump valve further comprises a second annular groove positioned directly adjacent and above the second bottom surface and a second wear-resistant pump valve gasket configured to mount inside the second annular groove and to form a second valve gasket seal with the top surface of the valve seat.

4. The wear-resistant hydraulic fracturing pump valve according to claim 2, wherein the wear-resistant hydraulic fracturing pump valve further comprises:
   a second annular groove positioned directly adjacent and above the second bottom surface; and
   a second wear-resistant pump valve gasket configured to mount inside the second annular groove and to form a second valve gasket seal with the top surface of the valve seat.

5. The wear-resistant hydraulic fracturing pump valve according to claim 1 wherein the first wear-resistant pump valve gasket is in a different plane from the plane of the first bottom surface.

6. The wear-resistant hydraulic fracturing pump valve according to claim 1, wherein the first wear-resistant pump valve gasket has a pressure rating of at least 15,000 pounds per square inch.

7. The wear-resistant hydraulic fracturing pump valve according to claim 1, wherein the first wear-resistant pump valve gasket has a temperature rating of at least about 300° F.

8. The wear-resistant hydraulic fracturing pump valve according to claim 2, wherein the at least one guide is a wing guide.

9. The wear-resistant hydraulic fracturing pump valve according to claim 2, wherein the wear-resistant hydraulic fracturing pump valve further comprises four guides.

10. The wear-resistant hydraulic fracturing pump valve according to claim 2, wherein the at least one guide is configured to fit into the valve seat.

11. The wear-resistant hydraulic fracturing pump valve according to claim 1, wherein the first and second bottom surfaces of the valve head comprises a metal, and wherein the metal comprises at least one of stainless steel, carbon steel, titanium, nickel, magnesium, aluminum, brass, copper, or alloys thereof.

12. The wear-resistant hydraulic fracturing pump valve according to claim 1, wherein the first wear-resistant pump valve gasket comprises a polymer comprising at least one of polyurethane, polyethylene, polypropylene, polyvinyl chloride, nylon, polytetrafluoroethylene, thermoplastic polyurethane, polystyrene, copolymers thereof, or combinations thereof.

13. A wear-resistant hydraulic fracturing pump valve, the wear-resistant hydraulic fracturing pump valve comprising:
(a) a valve head extending radially from a central axis, the valve head comprising:
   (i) a first bottom surface positioned closest to a base of the valve head, wherein the first bottom surface is configured to form a first metal seal with a top surface of a valve seat;
   (ii) a first annular groove positioned directly adjacent and above the first bottom surface;
   (iii) a second bottom surface positioned directly adjacent and above the first annular groove, wherein the second bottom surface is configured to form a second metal seal with the top surface of the valve seat and wherein a step places the first bottom surface and the second bottom surface in different parallel planes from each other;
   (iv) a second annular groove positioned directly adjacent and above the second bottom surface; and
   (v) a third bottom surface positioned directly adjacent and above the second annular groove, wherein the third bottom surface is configured to form a third metal seal with the top surface of the valve seat;
(b) a first wear-resistant pump valve gasket configured to mount inside the first annular groove and to form a first valve gasket seal with the top surface of the valve seat; and
(c) a second wear-resistant pump valve gasket configured to mount inside the second annular groove and to form a second valve gasket seal with the top surface of the valve seat.

14. The wear-resistant hydraulic fracturing pump valve according to claim 13, wherein the wear-resistant hydraulic fracturing pump valve further comprises at least one guide extending out from the base of the valve head and extending outwardly from the central axis.

15. The wear-resistant hydraulic fracturing pump valve according to claim 13, wherein the first and second bottom surfaces of the valve head comprises a metal, and wherein the metal comprises at least one of stainless steel, carbon steel, titanium, nickel, magnesium, aluminum, brass, copper, or alloys thereof.

16. The wear-resistant hydraulic fracturing pump valve according to claim 13, wherein one or more of the first wear-resistant pump valve gasket and the second wear-resistant pump valve gasket comprise a polymer comprising at least one of polyurethane, polyethylene, polypropylene, polyvinyl chloride, nylon, polytetrafluoroethylene, thermoplastic polyurethane, polystyrene, copolymers thereof, or combinations thereof.

17. The wear-resistant hydraulic fracturing pump valve according to claim 13, wherein one or more of the first wear-resistant pump valve gasket and the second wear-resistant pump valve gasket has a pressure rating of at least 15,000 pounds per square inch.

18. The wear-resistant hydraulic fracturing pump valve according to claim 13, wherein one or more of the first wear-resistant pump valve gasket and the second wear-resistant pump valve gasket has a temperature rating of at least 300° F.

19. The wear-resistant hydraulic fracturing pump valve according to claim 14, wherein the at least one guide is a wing guide.

20. The wear-resistant hydraulic fracturing pump valve according to claim 14, wherein the wear-resistant hydraulic fracturing pump valve further comprises four guides.

21. The wear-resistant hydraulic fracturing pump valve according to claim 14, wherein the at least one guide is configured to fit into the valve seat.

* * * * *